(12) United States Patent
Jahn et al.

(10) Patent No.: US 11,133,624 B2
(45) Date of Patent: Sep. 28, 2021

(54) ELECTRICAL PLUG HAVING A TEMPERATURE SENSOR

(71) Applicants: Christian Jahn, Quickborn (DE); Sebastian Obermeyer, Hamburg (DE)

(72) Inventors: Christian Jahn, Quickborn (DE); Sebastian Obermeyer, Hamburg (DE)

(73) Assignee: innogy SE, Essen (DE)

(*) Notice: Subject to any disclaimer, the term of this patent is extended or adjusted under 35 U.S.C. 154(b) by 0 days.

(21) Appl. No.: 16/908,068

(22) Filed: Jun. 22, 2020

(65) Prior Publication Data

US 2020/0321735 A1 Oct. 8, 2020

Related U.S. Application Data

(63) Continuation of application No. PCT/EP2018/085253, filed on Dec. 17, 2018.

(30) Foreign Application Priority Data

Dec. 22, 2017 (DE) .............. 10 2017 131 128.9

(51) Int. Cl.
*H01R 13/66* (2006.01)
*G01K 11/32* (2021.01)

(52) U.S. Cl.
CPC ......... *H01R 13/6683* (2013.01); *G01K 11/32* (2013.01)

(58) Field of Classification Search
CPC .................. H01R 13/6683; G01K 11/32
See application file for complete search history.

(56) References Cited

FOREIGN PATENT DOCUMENTS

| CN | 101 022 213 A | 8/2007 |
| CN | 101 414 034 B | 8/2012 |
| CN | 106 168 511 A | 11/2016 |
| CN | 106168511 A * | 11/2016 |
| CN | 206 117 107 U | 4/2017 |
| CN | 106 911 118 A | 6/2017 |
| CN | 206 313 400 U | 7/2017 |
| DE | 10 2015 004 313 A1 | 10/2016 |
| DE | 10 2015 109 493 A1 | 10/2016 |
| DE | 10 2015 115 657 B3 | 2/2017 |
| JP | 2017-187155 A | 10/2017 |

* cited by examiner

*Primary Examiner* — Brandi N Hopkins
*Assistant Examiner* — Janice M Soto
(74) *Attorney, Agent, or Firm* — Reinhart Boerner Van Deuren P.C.

(57) ABSTRACT

Disclosed are embodiments of an electrical plug, in particular a medium voltage plug or a high voltage plug, for a power cable including at least one housing configured to receive at least one electrical plug module. The plug includes at least one fiber optic cable arranged in the housing as a temperature sensor of a temperature measuring arrangement.

6 Claims, 7 Drawing Sheets

ELECTRICAL PLUG HAVING A TEMPERATURE SENSOR

CROSS-REFERENCE TO RELATED PATENT APPLICATIONS

This patent application is a continuation of PCT/EP2018/085253, filed Dec. 17, 2018, which claims the benefit of German Patent Application No. DE 10 2017 131 128.9, filed Dec. 22, 2017, the entire teachings and disclosure of which are incorporated herein by reference thereto.

FIELD

The application relates to an electrical plug, in particular a medium voltage plug or a high voltage plug, for a power cable (e.g. a current-carrying medium voltage or high voltage cable), comprising at least one housing configured to accommodate at least one electrical plug module. In addition, the application relates to a temperature measuring arrangement, a temperature monitoring system and a method.

BACKGROUND

Medium voltage plugs and/or high voltage plugs, but also other electrical plugs, are used in various systems to establish a conductive connection (power or current flow) between components of the system. An exemplified system is an offshore wind energy system and an offshore wind farm, respectively. In such a system, power cables, in particular current-carrying cables such as submarine cables, are used to connect, for example, at least two wind turbines with each other or a substation with a wind turbine. In order to connect a power cable to one of these system components, electrical plugs, e.g. medium voltage plugs and/or high voltage plugs, are used. A plug is connected, on the one hand, to the power cable and, on the other hand, to an electrical component (e.g. transformers or switchgears in the medium and high voltage range). In today's offshore wind energy systems and wind farms, respectively, typically 500 to 1500 of such plugs are installed, depending on the size of the system.

However, the installation of electrical plugs, in particular in the form of medium voltage plugs and/or high voltage plugs, i.e. the connection to a power cable, proves to be difficult. Incorrect installation can occur, for example, if the conductive layer of the power cable is cut back too far. The electrical contact between a (single) phase line and a plug module in the form of a cable connection module of the plug may also be insufficient.

Such incorrect installation can lead to a damage of the plug and, thus, of the other electrical components during operation and thus to a failure of the corresponding electrical connection. Indeed, it is known from the state of the art that the failed connection can be detected. However, the search for the cause of the fault and in particular the location of the failed connection is complex. Accordingly, the elimination of the fault is complex and lengthy. In particular, identifying a faulty electrical plug in an offshore wind energy system can take a long time. In an offshore wind energy system, this in turn can lead to longer downtimes of a plurality of wind turbines and correspondingly high costs.

BRIEF SUMMARY

Therefore, the object of the application is to provide an electrical plug, in particular a medium voltage plug and/or high voltage plug, which enables the timely detection (in particular in (almost) real time) of a plug fault during the operation of a system, in particular a wind energy system.

The object is solved according to a first aspect of the application by an electrical plug, in particular a medium voltage plug or a high voltage plug, for a power cable. The electrical plug comprises at least one housing. The housing is configured to accommodate at least one electrical plug module. The electrical plug comprises at least one fiber optic cable arranged in the housing as a temperature sensor of a temperature measuring arrangement.

In contrast to the state of the art, an electrical plug (connector) is provided, which allows a timely detection (in particular (almost) in real time) of a plug fault by equipping the electrical plug, in particular a medium voltage plug or high voltage plug, with a temperature sensor in the form of an fiber optic cable. This allows the temperature of the plug to be monitored and detected, in particular in real time. From the detected temperature, the operating state of the plug can be determined, in particular in real time, and thus a plug fault during operation of the plug can be avoided or directly detected. Due to the small diameter of a fiber optic cable, it can be integrated into the plug, in particular into the housing, in a simple and space-saving way. In addition, a fiber optic cable enables the temperature of the plug to be determined with a high spatial resolution. Plug faults that occur in connection with heat development in the electrical plug can therefore be detected and avoided at an early stage. Due to the evaluation (almost) in real time, the faulty plug can be replaced without the wind turbine or any other device having to be deactivated and stopped, respectively, due to the fault.

The electrical plug is configured for connecting it to at least one power cable. In particular, a plug can be electrically and mechanically coupled with at least one line of a power cable. The electrical plug is configured in particular for voltages greater than 1 kV. Preferably, the electrical plug can be a medium voltage plug (e.g. 1 kV to 36 kV) or a high voltage plug (e.g. up to 150 kV).

The plug in accordance with the application comprises at least one housing. The housing is configured to accommodate at least one plug module (e.g. an electrical connection module for electrical contact with the power cable or at least one line and/or phase of the power cable). In particular, the housing may enclose the plug module. In addition to providing a mechanical protection, the housing can also provide electrical insulation for the electrical components. In addition, the housing can also comprise a field control unit.

According to the application, it has been recognized that, in particular, an installation fault of an electrical plug, i.e. an improper mechanical and/or electrical coupling of the plug to at least one line of a power cable, can lead to a plug fault or operating fault of the plug. In particular, improper coupling between the plug and at least one line of the power cable leads to a change, in particular an increase, of the temperature of the plug and operating temperature of the plug, respectively. An increased plug temperature and operating temperature, respectively, can then lead to a damage of the plug and an interruption of the corresponding electrical connection.

In order to detect a plug fault in a timely manner, in particular before the plug is damaged and the corresponding electrical connection is interrupted, it is proposed according to the application to equip the plug with a (linear) temperature sensor in the form of a fiber optic cable. The fiber optic cable is arranged within the housing. The fiber optic cable is a temperature sensor of a temperature measuring arrangement. The temperature measuring arrangement is configured in particular to determine the (instantaneous and/or spatially resolved) temperature of the plug.

The electrical plug in accordance with the application can be used in the entire medium and high voltage network, preferably in a wind power system or a photovoltaic system.

The arrangement of the fiber optic cable in the housing can basically be designed in an arbitrary way, as long as the temperature of the plug can be determined by means of the fiber optic cable. In accordance with a first preferred embodiment of the electrical plug in accordance with the application, the housing can be formed by at least one (circumferential) wall with an inner side and an outer side. The fiber optic cable can preferably be arranged at least partially on the inner side of the wall. In particular, the fiber optic cable may be (directly) adjacent to the inner side of the wall. Laying the fiber optic cable on the inner side of the housing wall is simple. Preferably, the fiber optic cable can be fixed to the wall with suitable fixing means (e.g. adhesives) after the laying.

The (housing) wall may enclose the at least one plug module and may in particular include at least one insulation layer. The housing wall may preferably be made of a plastic material. For example, the housing wall may be formed at least partially from ethylene-propylene-diene rubber (EPDM) or a metal (e.g. steel). It shall be understood that other materials may be used.

As described above, the housing can be formed by at least one (circumferential) wall with an inner side and an outer side. As an alternative or in addition to the at least partial arrangement on the inner side of the wall, the fiber optic cable can be at least partially integrated in the wall (e.g. in the insulation layer). This allows in particular a fixed positioning of the fiber optic cable. In other words, a shift in the position of the fiber optic cable is (almost) impossible. At the same time, the housing wall provides good mechanical protection for the fiber optic cable. Preferably, the fiber optic cable can already be integrated into the housing wall during the production of the housing.

The housing wall may in particular have a sensor connection (in particular at least two connection pins for the two ends of the at least one fiber optic cable). The sensor connection can be configured to couple a (separate) temperature measuring device and/or evaluation device. The connection pins can be formed by the fiber optic cable itself.

For a particularly good temperature monitoring of the plug, the fiber optic cable can be arranged in the housing in the form of a plurality of windings, according to a further embodiment of the plug according to the application. Preferably, the plurality of windings and turns, respectively, can be arranged evenly distributed over the entire housing. Evenly means in particular that the distance between two adjacent windings can be almost equal. For example, the inner side may be spirally laid with the fiber optic cable and/or the fiber optic cable may be laid spirally through the wall of the housing. In this case, the fiber optic cable can be laid in a ring connection from a first connection pin to the further connection pin of the sensor connection. In particular, the distance can be selected such that the temperature of the entire interior of the housing can be measured with a specific spatial resolution. The spatial resolution can be selected in such a way that preferably all (critical) plug modules of the plug can be monitored. This allows not only the detection of a faulty plug, but also the identification of the faulty plug module.

An electrical plug according to the present application may comprise one or more plug module(s). According to an embodiment, the at least one electrical plug module may be selected from the group comprising at least one connection module, in particular a screw or press input connection and/or a screw or press output connection (also called a clamping cone), at least one termination insert module, in particular a screw termination insert, at least one contact ring, at least one tension spring, at least one control electrode, and at least one field control module, in particular a field control insert.

The connection module can be a screw or press input plug to electrically and mechanically couple at least one line of a cable to the plug. By means of a screw or press input connection, a plug counterpart of a further component can be connected to the plug in order to enable an electrical connection between the further component and the power cable, in particular the at least one line of the power cable. A termination insert module may be provided in the form of a screw termination insert, for example. Such an insert can provide a capacitive test point. Alternatively or additionally, a field control insert and a field control unit, respectively, may be provided in the plug. A field control unit can influence and control, respectively, an electric field at a wire shield edge of the power cable, in particular in a transition area from a shielded to an unshielded area of the power cable.

As described above, it is preferably possible to identify the plug module which is faulty from of the plurality of plug modules of the plug, by an in particular complete lining of the inner side of the housing (and/or by a corresponding integrated solution) with windings of an fiber optic cable. The identification can be made because a plug module heats up a specific area of the fiber optic cable (more) due to its (individual) position in the plug. This temperature peak can be detected. A plug fault can also be precisely detected by a destruction of a fiber optic cable in the plug module.

By identifying the faulty plug module, the measures for eliminating the fault can be optimally coordinated. While, for example, a first plug module should be replaced immediately, the identification of another plug module may initially allow a further operation. It may be necessary to reduce the current flowing through the plug by a specific amount (at least temporarily).

A further aspect of the application is a temperature measuring arrangement for an electrical plug, in particular an electrical plug described above. The temperature measuring arrangement comprises at least one fiber optic cable arranged in the plug as a temperature sensor. The temperature measuring arrangement comprises at least one temperature measuring device connected to the fiber optic cable. The temperature measuring device comprises at least one temperature measuring module. The temperature measuring module is configured to determine the temperature of the plug, in particular to determine the temperature of the plug with spatial resolution.

The temperature measurement arrangement can be used in the entire medium and high voltage network, in particular in a wind power system or a photovoltaic system.

As already described, the housing of the plug can comprise a sensor connection to which a temperature measuring device of the temperature measuring arrangement can be connected. The temperature measuring arrangement in accordance with the application is in particular a fiber-optic temperature measuring arrangement with the heat and radiation sensitive fiber optic cable (in particular a corresponding optical fiber cable).

With the aid of the temperature measuring module, the temperature values in the glass fiber of the fiber optic cable can be determined with spatial resolution. The temperature measuring module may in particular comprise a frequency generator, a laser source, an optical module, a receiver unit and/or a microprocessor unit and may be coupled to the fiber optic cable (e.g. a quartz glass fiber). For example, the laser source can be sinusoidal modulated in intensity and chirped in frequency according to an OFDR (Optical Frequency Domain Reflectometry) method within a measuring interval. The local resolution of the reflectometer can be adjusted via the frequency deviation.

The frequency-modulated laser light can be coupled into the fiber optic cable. A temperature-dependent light scattering (Raman scattered light) occurs at any location along the fiber optic cable, which radiates in all directions in space. The Raman scattered light is directly related to the temperature of the plug. A part of the Raman scattered light reaches the temperature measuring module in the reverse direction. The back-scattered light can be spectrally filtered and converted into electrical signals in the measuring channels by means of photodetectors, amplified and electronically processed. The microprocessor can perform a Fourier transformation and provide Raman backscatter curves as an intermediate result as a function of the length of the fiber optic cable. The amplitudes of the backscatter curves are proportional to the intensity of the respective Raman scattering. From the ratio of the backscattering curves, the fiber temperature along the fiber optic cable can be determined location-dependent, i.e. spatially resolved. The determination of the temperature therefore generally includes the determination of location-dependent temperature values, wherein the determination can be carried out (at least almost) continuously or at specific time intervals.

A still further aspect of the application is a temperature monitoring system, in particular for at least one electrical plug, preferably a plurality of electrical plugs. The temperature monitoring system comprises at least one temperature measuring arrangement described above. The temperature monitoring system comprises at least one evaluation device which can at least be connected to the temperature measuring device, comprising at least one evaluation module. The evaluation module is configured to determine a plug fault and an operating fault, respectively, of the plug at least based on the determined temperature of the plug.

The temperature monitoring system can be used in particular to monitor at least one electrical plug described above, in particular a plurality of these plugs, for example all plugs of a common power cable. In particular, the temperature monitoring system can be used to monitor a plurality of electrical plugs of a specific (medium and/or high voltage) system, such as a wind power system with two or more wind turbines, or a photovoltaic system with two or more photovoltaic devices.

The temperature monitoring system comprises at least one evaluation device. The evaluation device can at least be connected to the temperature measuring device described above in order to provide the determined temperature values to the evaluation device, for example the evaluation module. In addition to the separate design of the evaluation device and the temperature measuring device, a design in a common unit is also conceivable. For example, the evaluation device can form the temperature measuring device and comprise the temperature measuring module.

The evaluation module is configured to determine, at least based on the provided temperature values of the at least one plug, whether a plug fault is present or not with this plug. If there is a plug fault, the evaluation module can, for example, cause the transmission of a corresponding message (e.g. to a central control of the wind power system or photovoltaic system). The measures described above can then be taken.

In accordance with a preferred embodiment of the temperature monitoring system according to the application, the evaluation device may comprise at least one comparison module. The comparison module may be configured to compare the determined temperature (and temperature values, respectively) of the plug with at least one reference temperature (and reference temperature values, respectively). The evaluation module can be configured to determine a plug fault of the plug based on the comparison result. According to an embodiment, the reference temperature can be a maximum permissible (specified) temperature value. Here, a plug fault can be determined, for example, by detecting that the temperature value is exceeded by the determined temperature of the plug.

Preferably, a plurality of reference temperature values can be specified for the respective plug modules of a plug. In particular, a different reference temperature value can be assigned to each plug module.

Alternatively or in addition to the at least one (fixed) specified reference temperature, the at least one reference temperature can be the determined temperature of at least one reference plug. Preferably, a plurality of reference temperatures can be provided by a corresponding plurality of reference plugs. A plug fault can be determined in this case if the determined temperature (and temperature values, respectively) of a first plug deviates from the one or more reference temperature(s) (and reference temperature value(s), respectively) by e.g. a pre-defined value. In particular, plugs of at least similar, preferably identical design of the preferably same electrical system (e.g. offshore wind energy system) can be used as reference plugs. Particularly preferred locally adjacent plugs can be used as reference plugs. These usually have the same ambient conditions (e.g. same ambient temperature, same ambient pressure, etc.).

According to a preferred embodiment, the reference plug can be connected to a first phase line of a power cable and the plug to be monitored can be connected to a further phase line of (the same) power cable. For example, the three phase lines of a power cable can each be provided with a plug in accordance with the application. Two of the three plugs can serve as reference plugs for the remaining plug. If the detected temperature of a first of the plugs deviates from the temperature of the other two (reference) plugs, a faulty first plug can be concluded. A plug fault of a plug can be determined in a reliable and at the same time simple way. In particular, with this embodiment, the plugs of the same power cable not only have the same environmental conditions, but usually also the same load.

As already described, according to one embodiment, the temperature measuring module can be configured for the spatially resolved determining of the temperature of the plug along the fiber optic cable. The evaluation module can be configured to determine a specific faulty plug module based on the determined, spatially resolved temperature of the plug.

A still further aspect of the application is a method for monitoring an electrical plug, in particular an electrical plug described above. The method comprises:

Measuring the temperature of the plug by means of a temperature sensor integrated in the plug, Determining a plug fault of the plug at least based on the measured temperature of the plug.

In particular, the method may be carried out using a previously described temperature measuring arrangement and/or a previously described temperature monitoring system.

A module, a device and/or an apparatus may comprise hardware components (e.g. processor, storage means etc.) and/or software components (computer code).

The features of the electrical plug, the temperature measuring arrangement, the temperature monitoring system and the method can be freely combined with each other. In particular, features of the description and/or the dependent claims, even if they completely or partially circumvent features of the independent claims, may be independently inventive, either alone or freely combined.

There is now a wide range of possibilities to design and develop the electrical plug according to the application, the temperature measuring arrangement according to the application, the temperature monitoring system according to the application and the method according to the application. In this respect, reference is made, on the one hand, to the patent claims subordinate to the independent patent claims and, on the other hand, to the description of embodiments in connection with the drawing.

DETAILED DESCRIPTION

In the figures, the same reference signs are used for similar elements.

Figure 1:
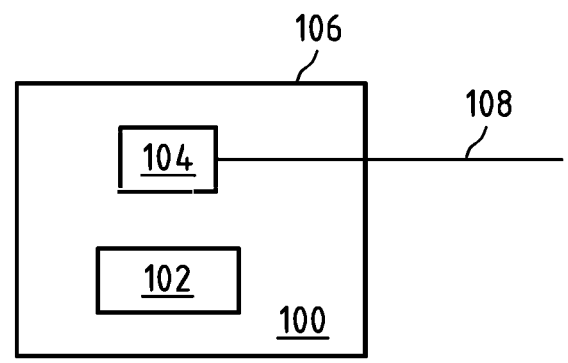
FIG. 1 is a schematic view of an embodiment of an electrical plug according to the present application.

FIG. 1 shows a schematic view of an embodiment of an electrical plug 100 in accordance with the present application. In particular, the electrical plug 100 may be a medium voltage plug 100 or a high voltage plug 100.

The electrical plug 100 shown here comprises a housing 106. The housing is formed in particular by a surrounding housing wall. The housing 106 comprises at least one plug module 102. It shall be understood that a plurality of plug modules can be provided. The housing 106 is configured to accommodate the at least one plug module 102. In particular, the wall of the housing 106 encloses the at least one plug module 102.

In addition, it can be seen from FIG. 1 that the electrical plug 100 comprises at least one linear temperature sensor 104. The temperature sensor 104 is a fiber optic cable 104 of a (not completely shown) temperature measuring arrangement. Via an (optical) connection 108 the fiber optic cable 104 can be connected, for example, to a (not shown) temperature measuring device of the temperature measuring arrangement. By means of the fiber optic cable 104 the temperature of the plug 100 (depending on the location along the fiber optic cable 104) can be measured. In particular, the temperature of at least one plug module 102 of the plug 100 can be measured.

Figure 2:
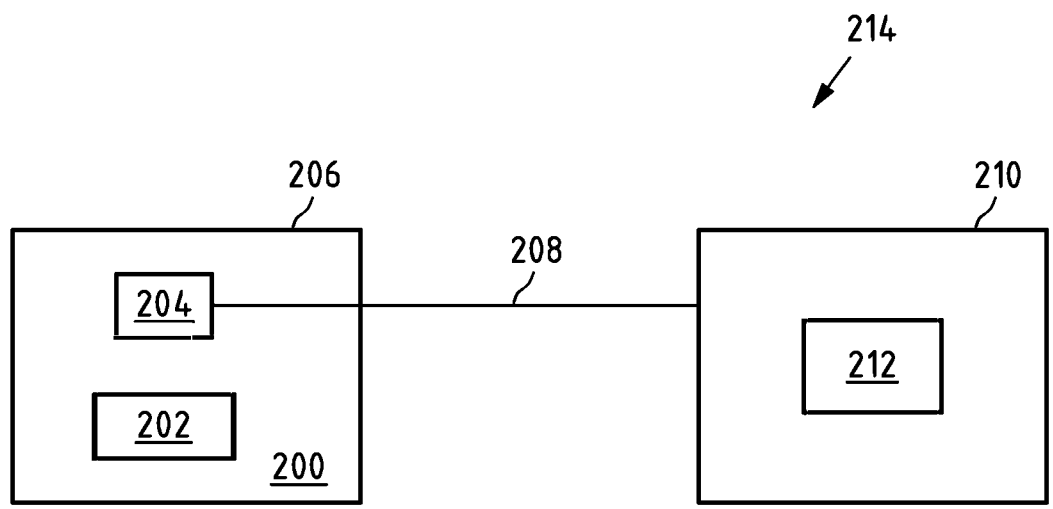
FIG. 2 is a schematic view of an embodiment of a temperature measuring arrangement according to the present application with an embodiment of an electrical plug according to the present application.

FIG. 2 shows a schematic view of an embodiment of a temperature measuring arrangement 214 configured to determine the temperature of an electrical plug 200. In order to avoid repetition, only the differences to the embodiment in FIG. 1 are described below. For the other components of the temperature measuring arrangement 214, in particular the plug 200, we refer in particular to the above explanations.

The temperature measuring arrangement 214 comprises at least one (separate) temperature measuring (detection) device 210 The temperature measuring device 210 is connected to the fiber optic cable 204 via the optical connection 208 described above (in particular also an fiber optic cable). The temperature measuring device 210 comprises at least one temperature measuring module 212. The temperature measuring module 212 can comprise measuring equipment as described above, such as a frequency generator, a laser source, an optical module, a receiver and a microprocessor unit. The temperature measuring module 212 is in particular configured for the spatially resolved temperature determination of the plug 200 along the fiber optic cable 204.

Figure 3:
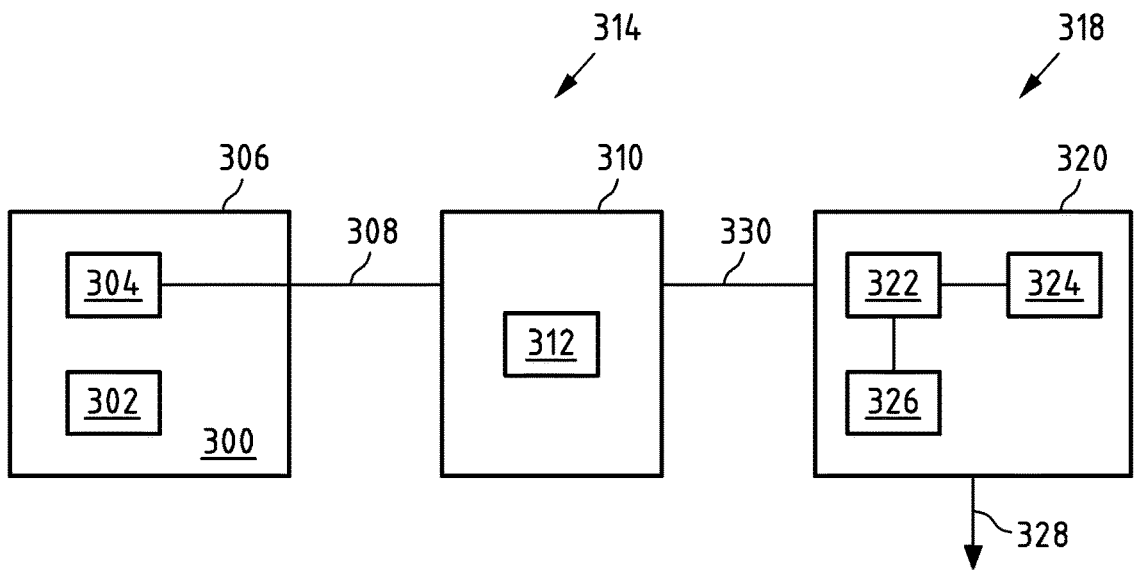
FIG. 3 is a schematic view of an embodiment of a temperature monitoring system according to the present application with an embodiment of a temperature measuring device according to the present application with an embodiment of an electrical plug according to the present application.

FIG. 3 shows a schematic view of an embodiment of a temperature monitoring system 318, configured to monitor at least one electrical plug 300. To avoid repetition, only the differences to the embodiments in FIGS. 1 and 2 are described below. For the other components of the temperature monitoring system 318, in particular the temperature measuring arrangement 314, reference is made to the above explanations.

The temperature monitoring system 318 comprises (in addition to at least one temperature measuring arrangement 314 described above) an evaluation device 320 which is connected to the temperature measuring device 310 via a (wireless and/or wired) communication link 330. For example, the evaluation device 320 can be a central evaluation device for a plurality of temperature measuring arrangements and/or electrical plugs. A corresponding evaluation device 320 can be integrated in a central control system of the system (e.g. controller of an offshore wind energy system, controller of a photovoltaic system etc.).

It goes without saying that the evaluation device and the temperature measuring device can also be arranged (at least partially) in a common housing according to another variant. The temperature measuring device 310 is configured in particular to provide to the evaluation device 320 the determined temperature values of the monitored plug 300.

The evaluation device 320 in this case comprises at least one comparison module 322, at least one memory module 324 and at least one evaluation module 326. The memory module 324 is in particular configured to store at least one (fixed) specified maximum permissible reference temperature.

The comparison module 322 is configured to carry out a comparison operation. In the comparison operation, in particular the at least one provided temperature value (in particular a location-dependent temperature function, i.e. in particular a plurality of location-dependent temperature values) is compared with the at least one stored reference temperature value. The comparison result is evaluated by the evaluation module 326 to determine a plug fault of the plug 300. A plug fault is present in particular if the determined plug temperature exceeds the maximum permissible reference temperature. In this case the evaluation module 326 can cause the output of a corresponding message via the further communication connection 328. For example, a (previously described) higher-level central controller of the power system can be informed. Then measures can be taken to eliminate the plug fault. For example, the controller can identify the affected electrical connection and automatically reduce the current load on this connection.

Figure 4:
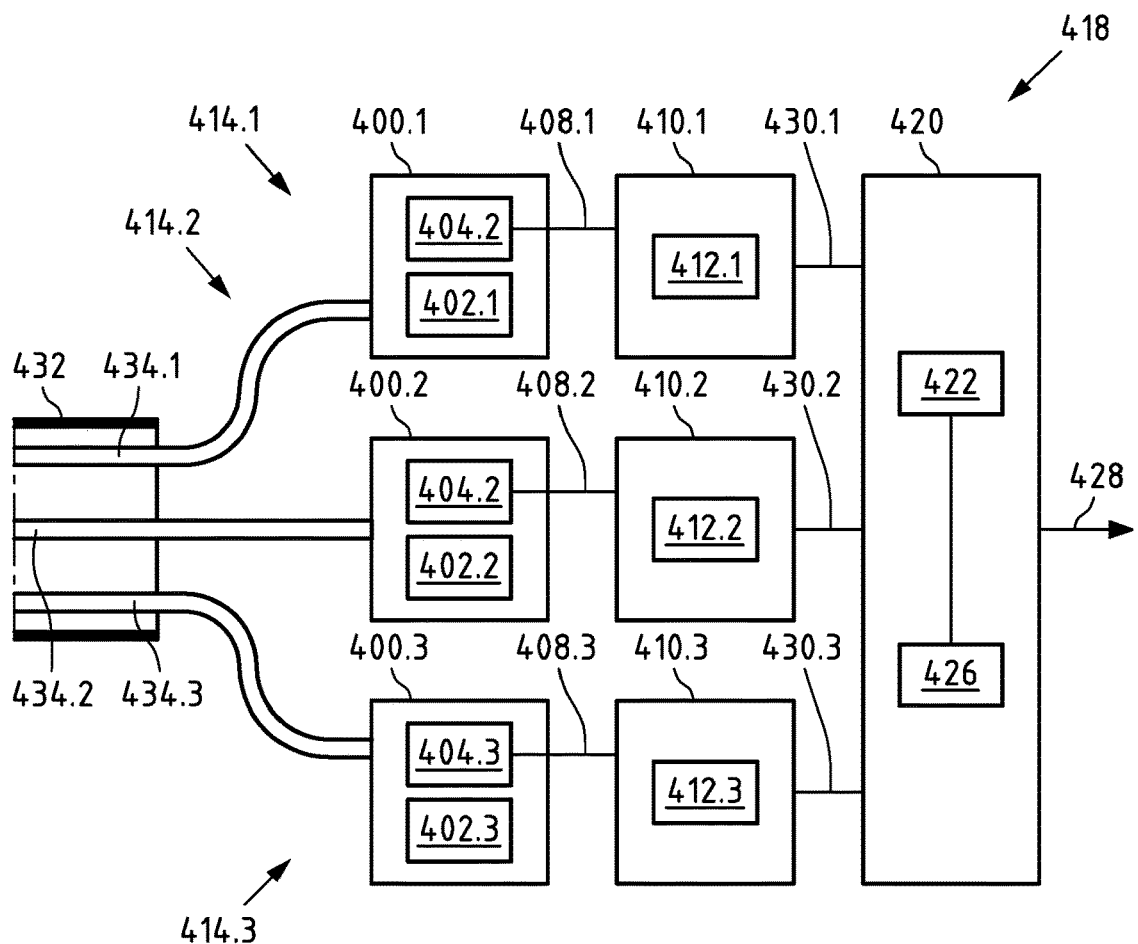
FIG. 4 is a schematic view of a further embodiment of a temperature monitoring system according to the present application with an embodiment of a temperature measuring arrangement according to the present application with an embodiment of an electrical plug according to the present application.

FIG. 4 shows a schematic view of a further embodiment of a temperature monitoring system 418, configured to monitor a plurality of electrical plugs 400.1 to 400.3. In order to avoid repetition, only the differences to the embodiment in FIG. 3 are described below. For the other components of the temperature monitoring system 418, we refer in particular to the above explanations.

In the present case, three electrical plugs 400.1 to 400.3 are shown. Each plug 400.1 to 400.3 comprises a previously described fiber optic cable 404.1 to 404.3, which is connected to a previously described temperature measuring device 410.1 to 410.3.

As can be seen, each plug 400.1 to 400.3 is connected to the same electrical power cable 432. In other words, the plugs 400.1 to 400.3 are assigned to the same power cable 432. In particular, each (phase) line 434.1 to 434.3 is electrically and mechanically coupled to a plug 400.1 to 400.3. As described above, the temperature of the respective plugs is preferably measured (almost) continuously and, in particular, evaluated (almost) in real time.

For evaluation, the evaluation device 420 can comprise at least one comparison module 422 and at least one evaluation module 426. In contrast to the previous embodiment, at least one, preferably both, determined temperature(s) of the other plugs 400.2 and 400.3 is used as the reference temperature for the plug temperature of a first plug 400.1.

In particular, it has been recognized that in the present embodiment, the load of the plugs 400.1 to 400.3, which are assigned to the same power cable 432, is (at least almost) identical. In addition, the ambient conditions (in particular the ambient temperature, ambient pressure, etc.) are (almost) identical for the plugs 400.1 to 400.3.

According to the application, it is proposed to detect the respective operating temperatures of the plugs 400.1 to 400.3 (almost) simultaneously and to compare these simultaneously detected operating temperatures with each other. If this comparison shows that the operating temperature of a first plug 400.1 differs from the operating temperatures (which then serve as a reference temperature) of the other plugs 400.2, 400.3 (e.g. by at least one pre-settable value), then the evaluation module 426 can determine a plug fault of the first plug 400.1. This enables a particularly timely detection of plug faults.

In the case mentioned above (see FIG. 3) the absolute temperature of the faulty plug 400.1 may still be permissible (e.g. due to a low load and/or favorable ambient conditions (e.g. low outside temperature)). Nevertheless, a plug fault can be detected promptly due to the previously described evaluation according to the application. As described above, in this case a corresponding message can be sent to a higher-level controller.

In general, therefore, at least one temperature of at least one reference plug can be detected as a reference temperature, which experiences at least almost the same load and/or almost the same ambient conditions as the monitored plug.

It goes without saying that the evaluation device may additionally include a memory module described above (see FIG. 3). In this variant two evaluations, in particular two comparison operations can be carried out. The comparison module can be configured to compare the at least one provided temperature with a fixed maximum permissible (absolute) reference temperature. This comparison result can be evaluated in the manner described above in order to determine a plug fault of a plug. In addition, the (simultaneously) detected temperatures of plugs 400.1 to 400.3 can be evaluated in the manner described above. A particularly reliable fault detection is given. It is possible to determine the faulty phase in a case of damage in three-phase voltage systems and, in particular, to obtain an exact statement as to which plug was damaged. Thus, the time needed to find the fault can be reduced.

Furthermore, it goes without saying that elements 410.1 to 410.3 and/or 420 can be arranged at least partially in a common housing (see also the explanations to FIG. 3).

Figure 5A:
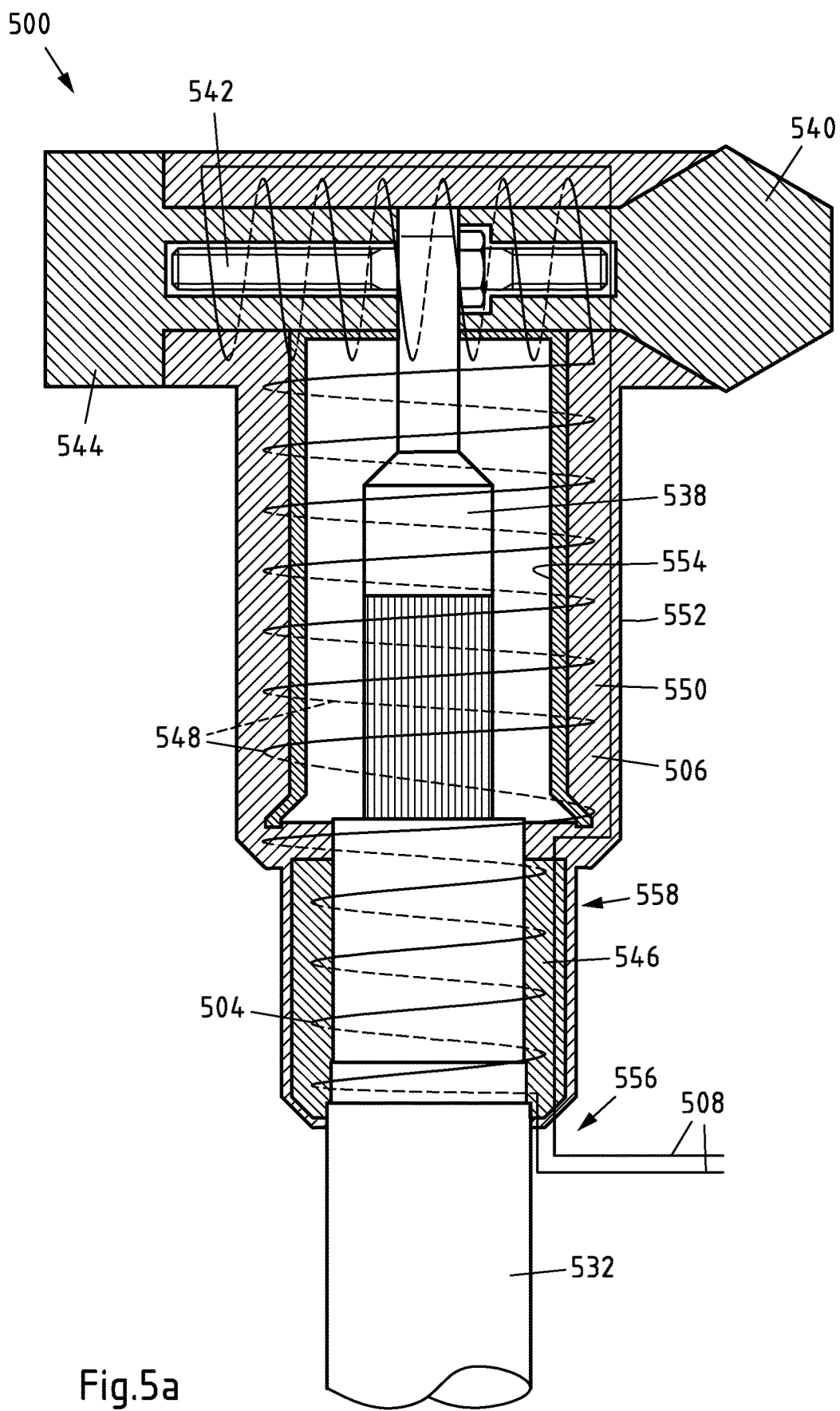
FIG. 5a is a schematic view of a further embodiment of an electrical plug according to the present application with a power cable inserted.
Figure 5B:
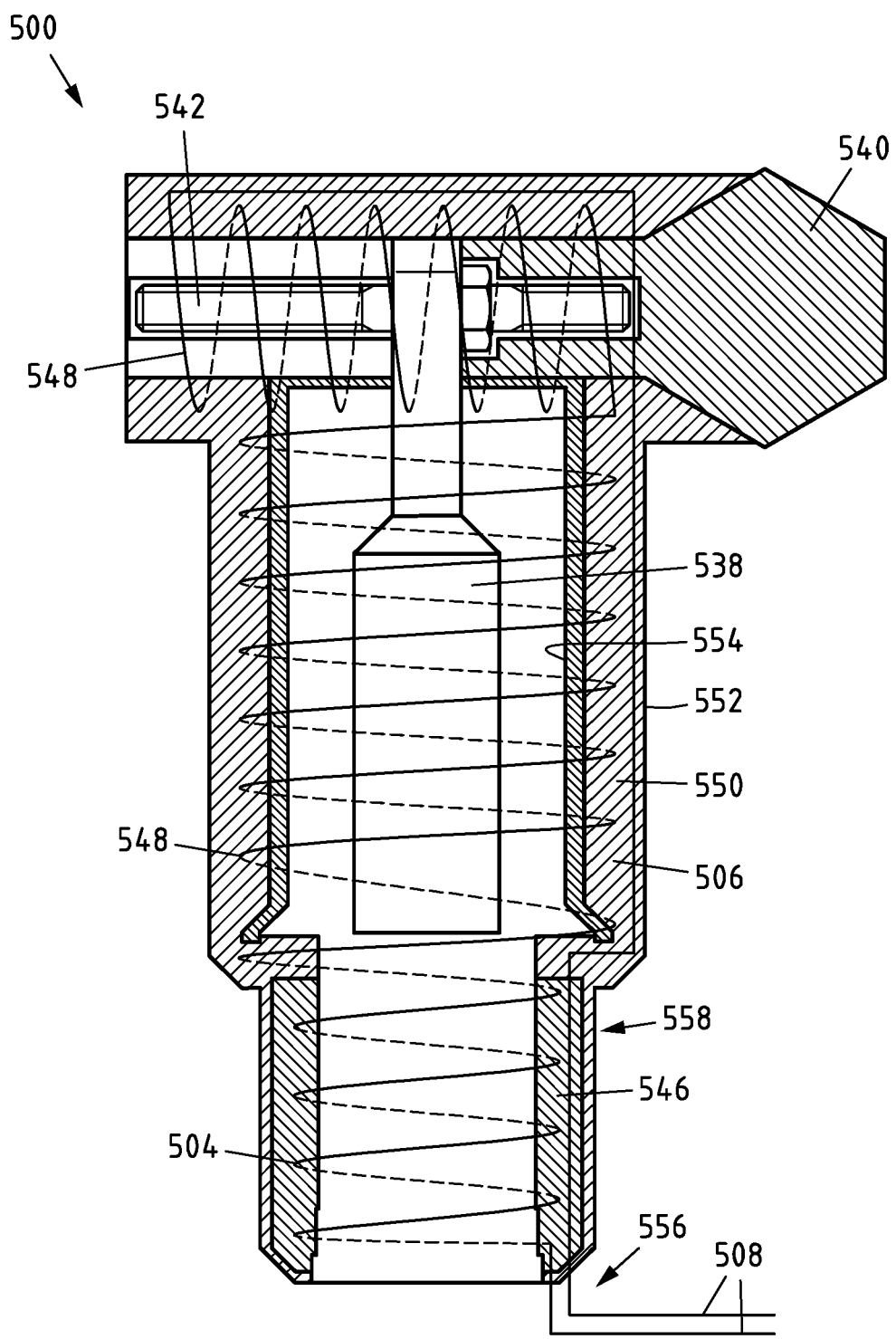
FIG. 5b is a schematic view of the embodiment according to FIG. 5a without an inserted power cable.

FIGS. 5a and 5b show a more detailed schematic view of an embodiment of an electrical plug 500 according to the present application. FIGS. 5a and 5b show an embodiment of a medium voltage electrical plug 500 with an outer cone with an inserted power cable 532 (or line) (see FIG. 5a) and without an inserted power cable (see FIG. 5b). In order to avoid repetition, reference is made below to the previous embodiments of FIGS. 1 to 4 and essentially only the differences are explained below.

The plug 500 comprises a housing 506 with a (housing) wall 550, which has an inner side 554 and an outer side 552. In addition, the plug 500 has a plurality of plug modules 538, 540, 542, 546. In particular, there is a screw or press input connection 538 (for the power cable 532 to be coupled), a screw termination insert 540 (e.g. with a capacitive test point), a screw contact or output connection 542 (e.g. for a plug counterpart 544) and a field control unit 546.

As can also be seen, the plug 500 comprises a linear temperature sensor 504 in the form of a fiber optic cable 504. The fiber optic cable 504 is laid in the form of windings 548 and turns 548, respectively. In particular, almost the entire interior of the housing 506 is essentially uniformly (evenly) equipped with the fiber optic cable 504. For example, the fiber optic cable 504 can be laid adjacent to the inner side 554 of the housing 506. It can also be provided that the fiber optic cable 504 is laid integrated in the housing wall 550 (i.e. between the inner side 554 and the outer side 552). It goes without saying that the above options can be combined with each other. Via a sensor connection 556, the fiber optic cable can be led to the outside and connected to a (not shown) temperature measuring device.

As the fiber optic cable 504 enables a spatially resolved temperature measurement and as the fiber optic cable 504 covers (almost) the entire interior of the housing 506, in which the plug modules 538, 540, 542, 546 are integrated, (separate) temperature monitoring and in particular temperature detection of each individual plug module 538, 540, 542, 546 is possible.

If, for example, a temperature measurement by a temperature measuring device results in an increased temperature in the area 558 and a subsequent (previously described) evaluation that this temperature value 558 (e.g. for a specific period of time) has exceeded a reference temperature, a plug fault in this area 558 can be concluded. In this case, for example, it could be a fault in field control unit 546 (for example, due to a defect in the power cable 532 in this area; the cable may have been damaged by a user during installation, for example). Optimum monitoring of a plug 500 can be achieved.

Figure 6A:
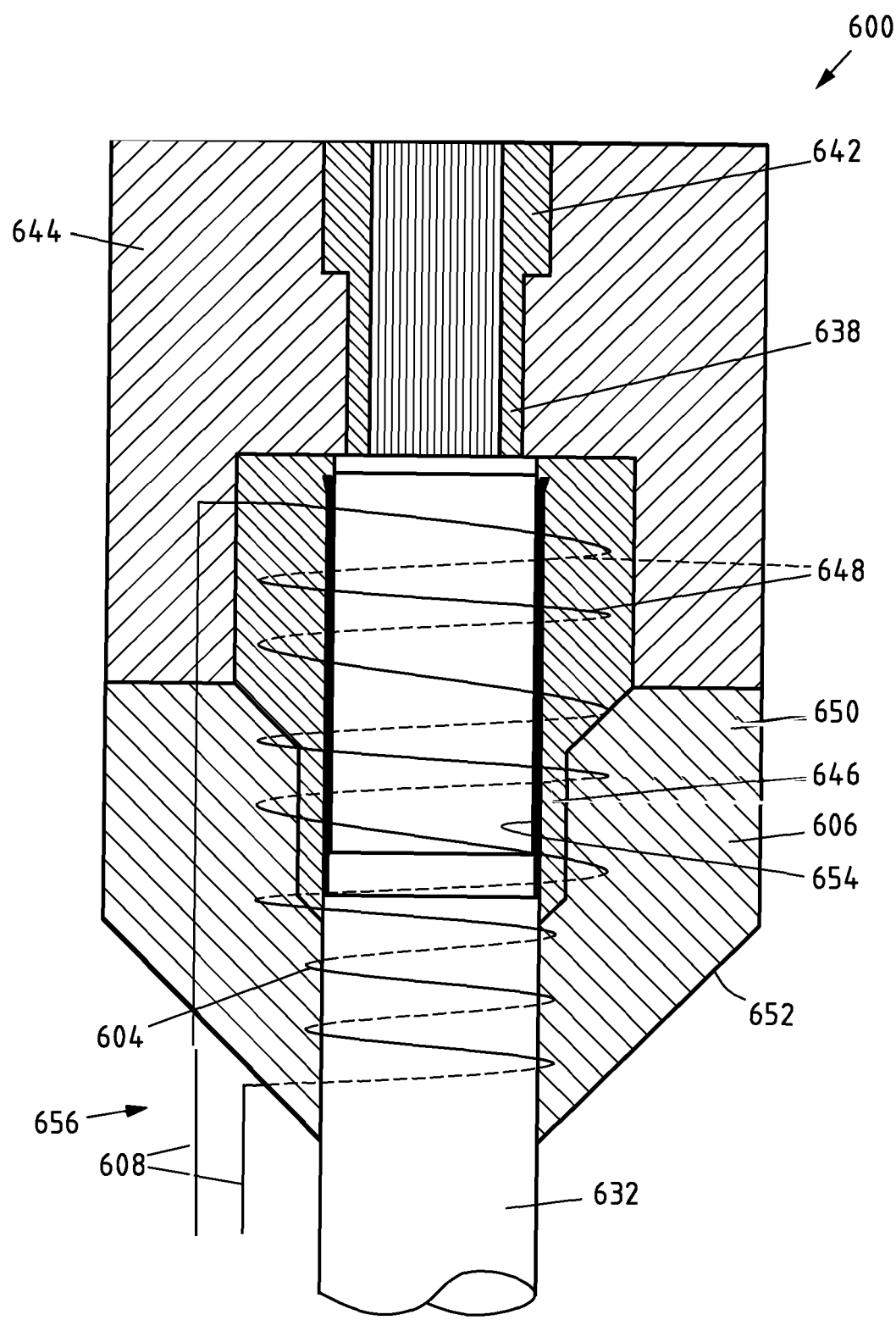
FIG. 6a is a schematic view of a further embodiment of an electrical plug according to the present application with the power cable inserted.
Figure 6B:
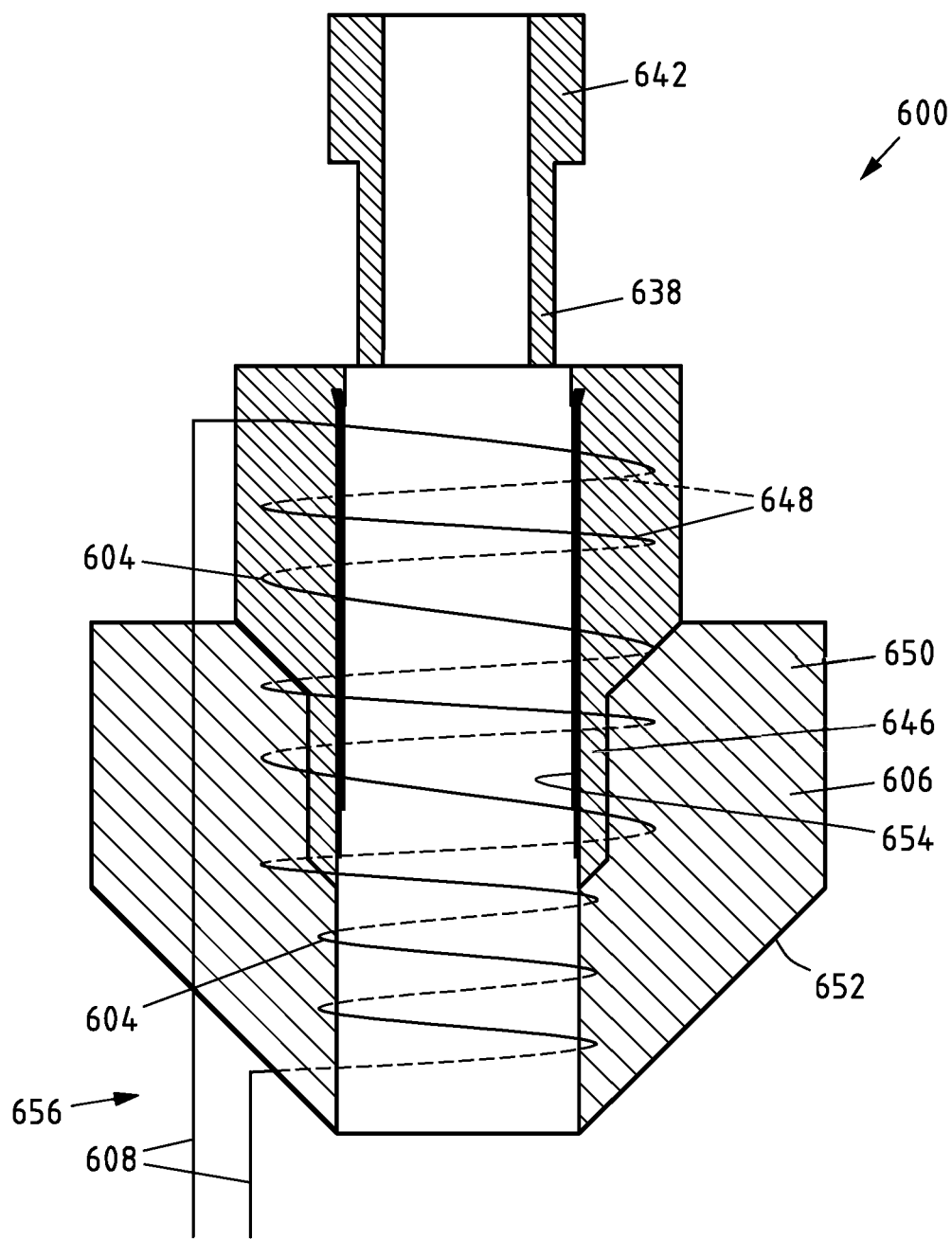
FIG. 6b is a schematic view of the embodiment according to FIG. 6a without an inserted power cable.

FIGS. 6*a* and 6*b* show a more detailed schematic view of a further embodiment of an electrical plug 600 as described in the present application. FIGS. 6*a* and 6*b* show an embodiment of a medium voltage electrical plug 600 with an inner cone with an inserted power cable 632 (or line) (see FIG. 6*a*) and without an inserted power cable (see FIG. 6*b*). In order to avoid repetition, please refer in the following to the previous embodiment of FIGS. 5*a* and 5*b*. Compared to this example, the plug differs mainly in its geometrical design. The plug comprises a housing 606 which encloses the plug modules 638, 640, 642, 646. In this embodiment, a fiber optic cable 604 is also provided, which covers at least almost the entire interior of the housing 606.

Figure 7:
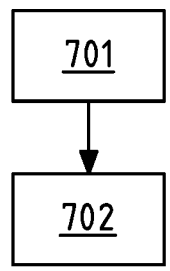
FIG. 7 is a diagram of an embodiment of a method according to the present application.

FIG. 7 shows a diagram of an embodiment of a method according to the application. In step 701, the temperature of a plug can be detected and measured, respectively, (in the manner described above) by means of a temperature sensor integrated in the plug. Based on the measured temperature of the plug, a plug fault is then determined in step 702 (in the manner described above).

In principle, early detection of plug faults, which can occur e.g. due to incorrect installation or aging of the material, is possible in accordance with the application. A permanent monitoring of the actual state of plugs can be carried out according to the application. This can shorten downtimes and prevent or at least reduce consequential damage.

In particular, a fiber optic cable may be integrated into the plug as described. This fiber optic cable can preferably be arranged and integrated, respectively, between the field control unit and the insulating part, above the insulating part, and/or, if present, on the voltage tap of the plug. In addition, the fiber optic cable can cover the area between the cut-back outer conductive layer of the (MV or HV) cable up to as close as possible to the plug contact on the switchgear or plug socket. This can be achieved by inserting the fiber optic cable evenly into the plug in windings. The actual core and, if necessary, the inner conductive layer and the core insulation of the cable can thus be completely enclosed.

By means of the fiber-optic temperature measurement according to the application, temperature changes in particular can be determined via fiber optic cable. Optical fibers are used as sensors, which allow an exact spatial allocation and reflect changes in temperature and pressure on the fiber. Due to the physical changes at the points where the temperature rises or the pressure on the fiber changes, reflections occur which contain components of different wavelengths in their backscattering. These scatterings can be roughly divided into Rayleigh scattering, Ramann scattering and Brillouin scattering. While Rayleigh scattering is not temperature-dependent, Ramann and Brillouin scattering are temperature-dependent scatterings which, unlike Rayleigh scattering, are spectrally shifted (so-called "Stoke" and "Anti Stoke" bands). Anti-Stoke bands are even more temperature dependent and are therefore preferably used for temperature measurements.

The at least one fiber optic cable installed in the plug can be led in a ring connection to a corresponding temperature measuring device.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A temperature monitoring system having a temperature measuring arrangement for electrical plugs, comprising:
at least one electrical plug in the form of a medium voltage plug or a high voltage plug for a power cable, comprising:
at least one electrical plug module,
at least one housing configured to accommodate the at least one electrical plug module, wherein the at least one electrical plug module is a field control module,
wherein the electrical plug comprises at least one fiber optic cable arranged in the housing as a temperature sensor of a temperature measuring arrangement,
wherein the housing is formed of at least one wall having an inner side and an outer side,
wherein the at least one fiber optic cable is at least partially integrated in the at least one wall, and
wherein the fiber optic cable is arranged in the housing in the form of a plurality of windings;

at least one fiber optic cable arranged in the at least one electrical plug as the temperature sensor, and at least one temperature measuring device connected to the at least one fiber optic cable, comprising at least one temperature measuring module, wherein the temperature measuring module is configured to determine the temperature of the at least one electrical plug, at least one evaluation device connectable to the temperature measuring device, wherein the evaluation device comprises at least one evaluation module, wherein the evaluation device comprises at least one comparison module configured to compare a determined temperature of the at least one electrical plug with at least one reference temperature, wherein the reference temperature is the determined temperature of at least one reference plug, and wherein the evaluation module is configured to determine a plug fault of the at least one electrical plug based on the comparison result.

2. The temperature monitoring system according to claim 1, wherein
the reference plug is a plug arranged locally adjacent to the at least one electrical plug.

3. The temperature monitoring system according to claim 1, wherein
the reference plug is connected with a phase line of a power cable and the at least one electrical plug is connected with a further phase line of the same power cable.

4. The temperature monitoring system according to claim 3, wherein
the phase line, the further phase line and a third phase line are each provided with a plug, and
two of the plugs serve as reference plugs for the respectively remaining plug.

5. The temperature monitoring system according to claim 1, wherein
the temperature measuring module is configured for a spatially resolved determination of the temperature of the at least one electrical plug along the fiber optic cable, and
the evaluation module is configured to determine a specific faulty plug module based on the determined spatially resolved temperature of the at least one electrical plug.

6. A method for monitoring an electrical plug in the form of a medium voltage plug or a high voltage plug for a power cable, comprising:
at least one electrical plug module,
at least one housing configured to accommodate the at least one electrical plug module, wherein the at least one electrical plug module is a field control module,
wherein the electrical plug comprises at least one fiber optic cable arranged in the housing as a temperature sensor of a temperature measuring arrangement,
wherein the housing is formed of at least one wall having an inner side and an outer side,
wherein the at least one fiber optic cable is at least partially integrated in the at least one wall, and
wherein the fiber optic cable is arranged in the housing in the form of a plurality of windings, the method comprising:
measuring the temperature of the at least one electrical plug by means of the temperature sensor integrated in the at least one electrical plug,
determining a plug fault of the at least one electrical plug at least based on a comparison of the measured temperature of the at least one electrical plug with a reference temperature, wherein the reference temperature is the determined temperature a reference plug.

* * * * *